May 12, 1925.

G. C. CARHART 1,537,582

GEAR LAPPING MACHINE

Filed March 7, 1923 4 Sheets-Sheet 3

INVENTOR.
George C. Carhart.
BY
ATTORNEYS.

May 12, 1925.  1,537,582

G. C. CARHART

GEAR LAPPING MACHINE

Filed March 7, 1923  4 Sheets-Sheet 4

INVENTOR.
George C. Carhart.
BY Parsons & Bodell
ATTORNEYS.

Patented May 12, 1925.

1,537,582

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

GEAR-LAPPING MACHINE.

Application filed March 7, 1923. Serial No. 623,589.

*To all whom it may concern:*

Be it known that I, GEORGE C. CARHART, a citizen of the United States, residing at Syracuse, in the county of Onondaga and State of New York, have invented a certain new and useful Gear-Lapping Machine, of which the following is a specification.

This invention has for its object a gear lapping machine, which is simple in construction and highly efficient and rapid in operation and by which a maximum number of teeth of each gear are subjected simultaneously to lapping operation.

The invention consists in the novel features and in the combinations and constructions hereinafter set forth and claimed.

In describing this invention, reference is had to the accompanying drawings, in which like characters designate corresponding parts in all the views.

Figure 5 is a fragmentary sectional view on line 5—5, Fig. 4.

This gear lapping machine comprises generally a pair of opposing racks, a gear support or carriage extending between the racks and arranged to hold the gears with their teeth in mesh with both racks and means for effecting relative movement of the racks and the gear carriage or support in a direction lengthwise of the racks and at an angle to the axis of the gear or gears.

It further preferably consists in means for effecting relative movement of the racks and gear carriage or support in a direction transversely of the racks and lengthwise of the axis of the gears.

Figure 1:
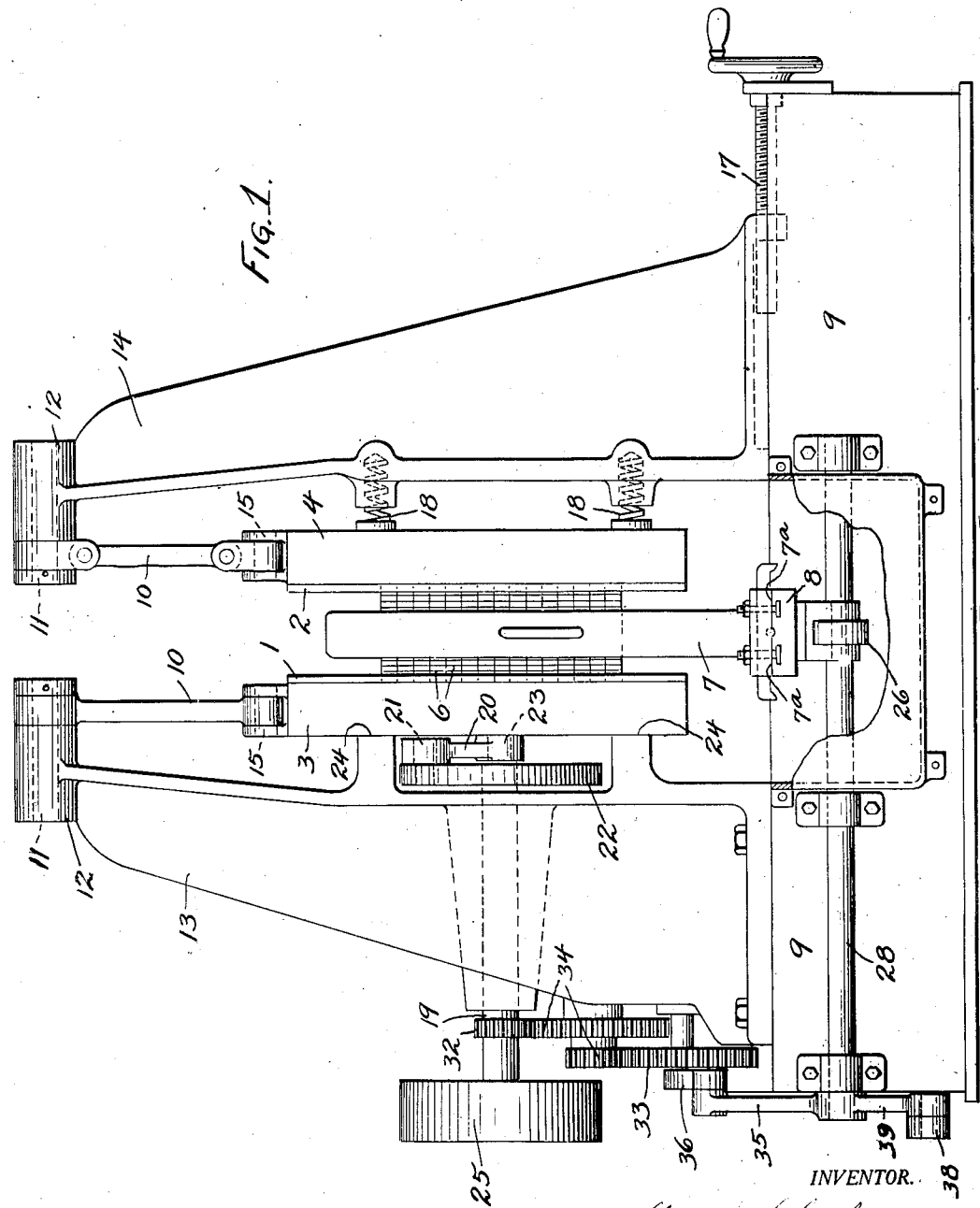
Figures 1 and 2 are respectively end and side elevations of one embodiment of this machine, Figure 2 being partly broken away.
Figure 2:
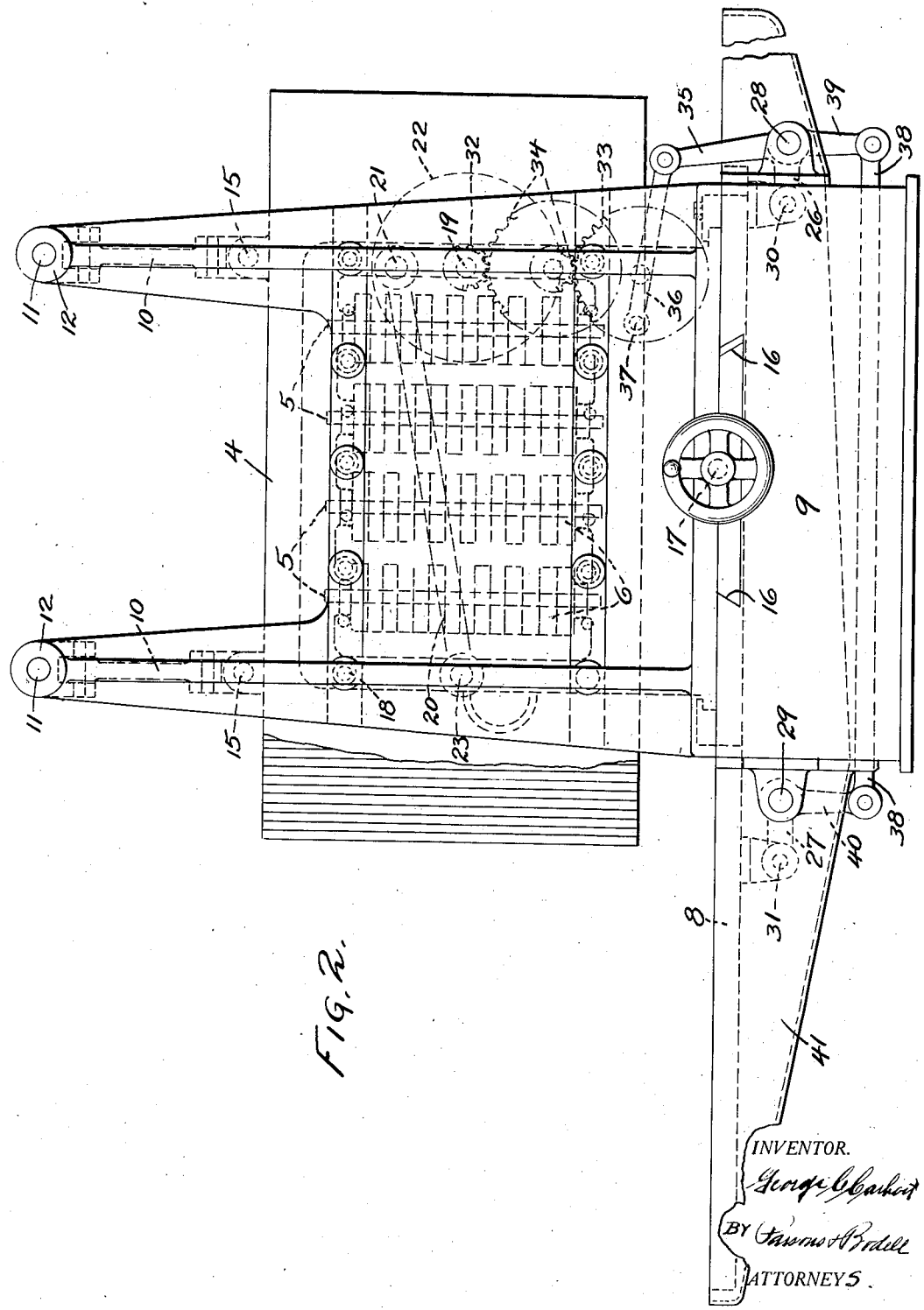
Figure 4:
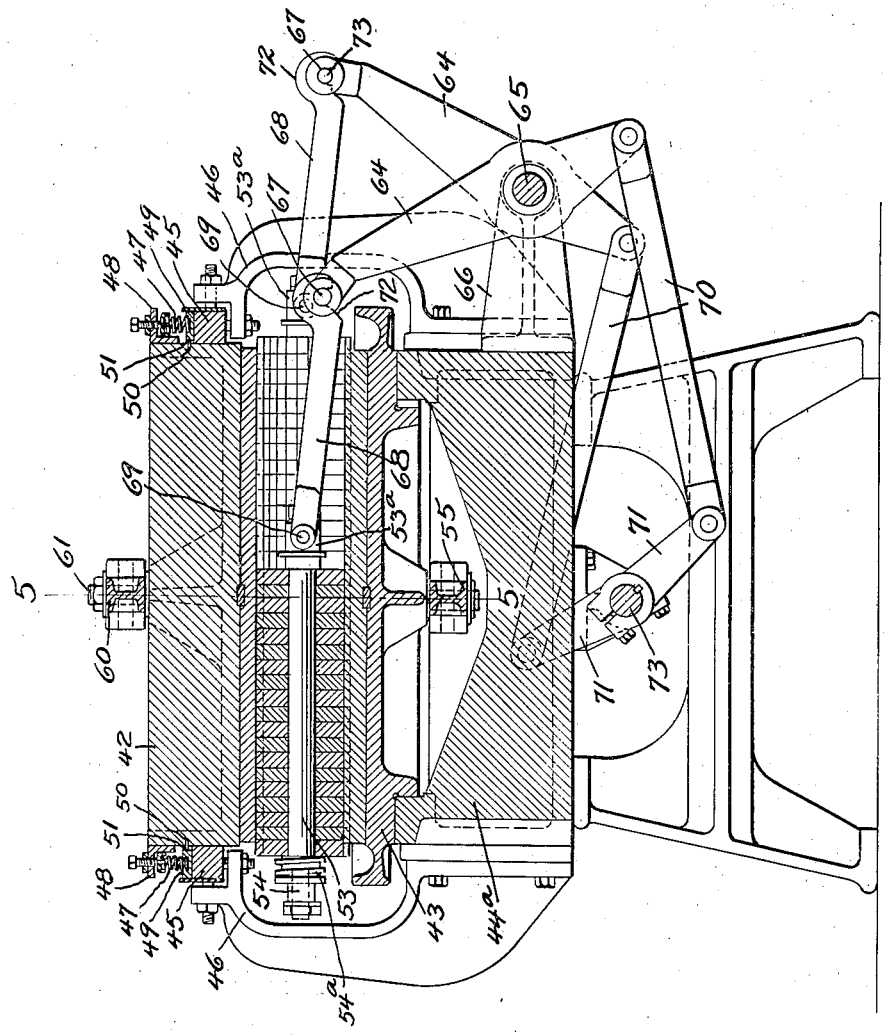
Figure 4 is a vertical cross sectional view of another form of this gear lapping machine showing the racks arranged in horizontal position.

In Figures 1 and 2, the racks are shown as arranged in vertical position and the gear carriage arranged to support the gear or gears with their axes upright and in Figures 4 and 5, the racks and gear carriage are shown as arranged in horizontal position.

In the machine shown in Figs. 1 and 2, 4 and 5, the gears are engaged with both racks so that the teeth on diametrically opposite sides thereof are lapped simultaneously, and hence a maximum number of teeth are subjected to the lapping operations at one time and the gears are lapped rapidly with a minimum number of movements. Preferably, relative movement of the racks and the gear carriage is effected by moving both the racks and the gear carriages.

Figure 3:
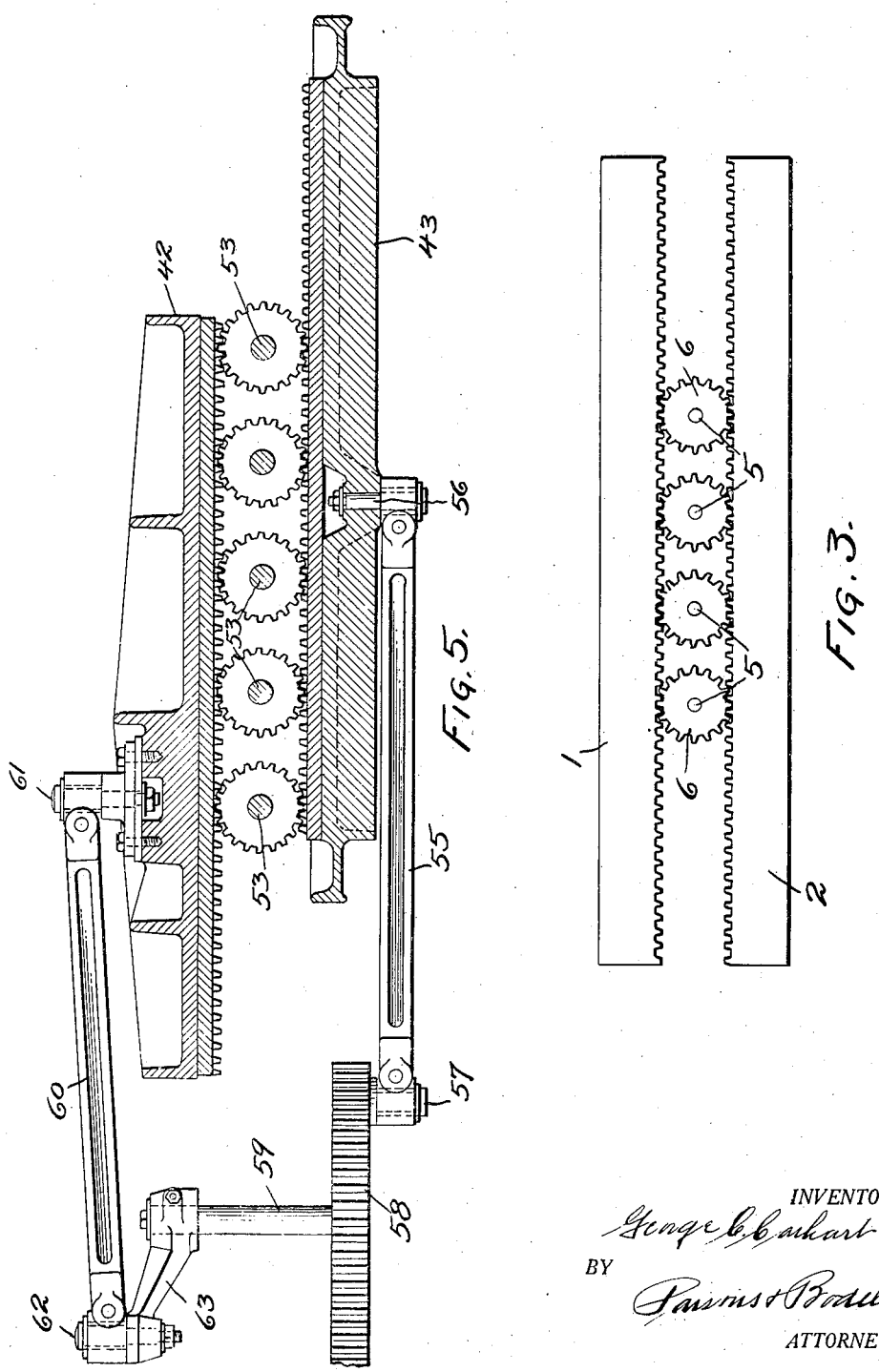
Figure 3 is a diagrammatic plan view or edge view of the racks with the gears located between them.

In Figs. 1, 2 and 3, the numerals 1 and 2 designate the racks mounted on beds or carriages 3, 4, respectively, the racks being arranged with their teeth extending vertically. These racks are usually toothed sections or slabs suitably secured to the carriages. The gear carriage is here illustrated as a spindle or mandrel 5 extending vertically between the racks and arranged to hold the gear or gears 6 so that they are in mesh with both racks. These carriages are here shown as one or more spindles mounted on a carriage 7 movable along ways 7ª in the main carriage 8, carried by the bed 9 on the main frame of the machine. The carriage 7 is slidable along the ways 7ª to carry the gears into and out of position between the racks 1, 2, and the main carriage 8 is movable reciprocally vertically to cause the gears to be moved or slid vertically along the teeth of the racks.

The rack carriages 3, 4, are preferably mounted to swing in arcs extending lengthwise of the racks and as here illustrated, each is supported by parallel links 10 pivoted at their upper ends on studs 11 mounted in bearings 12, provided at the upper ends of standard 13, or 14, forming part of the main frame, such links being pivoted at their lower ends at 15 to the upper edge of the rack carriage 3 or 4.

One of the rack carriages is shiftable toward and from the other in order to permit the gear carriage to be shifted along the ways 7ª to carry the gears between the racks and to move into mesh with such gears after the gears are placed between the racks.

In the illustrated embodiment of my invention, in Figs. 1 and 2, the rack carriage 4 is so shiftable, that the standard 14 on which it is mounted is movable laterally along ways 16 formed on the bed or main frame, by suitable means, as a manually operated feed screw 17 supported by the bed against endwise movement and threading into a passage in the standard 14.

The rack carriage 4 is also preferably spring-pressed and as here illustrated, compression springs 18 are located between the standards 14 and the outer face of the rack carriage 4.

The movement of the rack carriages is effected by means for actuating or reciprocating one of said carriages, as the carriage 3, and the movement of the carriage 3 is transferred and reversed to the other carriage 4 through the gears 6 on the spindles 5.

As here illustrated, the rack carriage 3 is actuated from a main drive shaft 19 journalled in the upright 13 which is fixed to a bed 9, and a connecting rod or a pitman 20 mounted at one end on a crank or wrist pin 21 provided on the wheel 22 on the inner end of said shaft 19 and mounted at its other end on the pin or stud 23 on the outer side of the rack carriage 3. Hence, during rotation of the drive shaft 19 the carriage 3 will be oscillated horizontally along guides 24 on the standard 13, and owing to the parallel links 10, will move in small arcs during such oscillations; and the rack carriage 4 is similarly oscillated but reversely relatively to the carriage 3 through the gears 6.

During such movement the springs 18 yieldingly thrust the rack 2 on the carriage 4 against the gears and prevent binding and undue pressure on the racks.

The main shaft 19 is provided with suitable means as a pulley 25 by which it may be connected to the source of power.

The main gear carriage 8 may be reciprocated vertically by any suitable mechanism and in the illustrated embodiment of my invention, the gear carriage 8 is supported by rock arms 26, 27, mounted respectively on rock shafts 28, 29, and pivoted at 30 and 31 respectively to the carriage 8; and such rock shafts are connected to the drive shaft 19 by suitable motion transmitting mechanism.

This mechanism is here illustrated as comprising a gear 32 on the drive shaft 19, a gear 33 mounted on a stud supported by the bed 1, a train of gears 34 between the gears 32, 33, a rock arm 35 on the shaft 28, a link 36 connecting such rock arm 35 and a crank pin 37 on the gear 33, and a link 38 connecting the rock arms 39, 40, on the shafts 28, 29 respectively.

Obviously, during the rocking of the shafts 28, 29, the carriage 8 will be moved up and down and carry the gears back and forth vertically lengthwise of the rack teeth.

The outer end portion of the carriage 8 is enclosed by a drip pan 41.

In Figures 4 and 5, the rack carriages 42, 43, and gear carriages 44 are arranged in horizontal positions instead of in vertical positions.

The lower rack carriage 43 is illustrated as mounted on the bed 44ª to reciprocate lengthwise, and the upper rack carriage 42 is also mounted to reciprocate lengthwise of the bed above and spaced apart from the rack carriage 43, it being here shown as movable lengthwise of the frame on ways 45 supported by brackets 46 extending upwardly from opposite sides of the frame. The rack carriage is preferably spring supported in order to not rest on, or not rest heavily on the gears being lapped so that the gears and rack will have a normal rolling contact or meshing engagement. The springs are here illustrated as compression springs 47 interposed between brackets or flanges 48 on opposite sides of the rack carriage 42 and shoes or slides 49 movable along the ways 45, these shoes being suitably coupled to the carriage to move back and forth therewith, but also to permit up and down yielding movement of the carriage.

Preferably, the shoes are coupled to the carriage 42 by pins 50 projecting laterally from the carriage 42 and extending into vertical slots 51 in the shoes.

The carriages 42, 43 are reciprocated oppositely to each other by any suitable mechanism.

The gear carriage comprises a spindle or arbor 53 extending between the rack carriages 42, 43, and movable crosswise thereof, and a head 53ª in which one end of the spindle or one end of the stems or axles of stem gears are mounted, in case stem gears are being lapped, the head being connected to actuating mechanism to be described.

The spindle is provided with suitable means as a head 54 at its outer or free end to hold the gears from axial displacement. The head 54 is preferably a duplicate of the head 53 so that the arbor is reversible end for end either head is connectable to the actuating mechanism. A spring 54ª is placed between the head 54 and the end gear to thrust the gears endwise against each other. There are usually several gear carriages and they are connected to the actuating mechanism so that while one gear carriage is moving in one direction crosswise of the rack the next gear carriage is moving in the opposite direction.

The lower rack carriage 43 is actuated by a pitman or connecting rod 55 pivoted at one end at 56 to the carriage 43 on the under side thereof and connected at its other end to rotary eccentric means as a crank or wrist pin 57 on the wheel or gear 58 mounted on a vertical shaft 59 mounted on the frame. The gear 58 is connected to the main drive shaft in any suitable manner.

The carriage 42 is also actuated by power, instead of through the gears being lapped, it being here shown as actuated by a pitman or connecting rod 60 pivoted at one end at 61 to the carriage 42 on the upper side thereof, and at its other end at 62 to the crank arm 63 on the shaft 59.

Each gear carriage may be actuated or reciprocated crosswise of the carriages 42, 43, by any suitable mechanism, that here shown being a rocking lever 64 mounted to rock about a shaft 65 supported by brackets 66, projecting from the frame, one arm of the lever being pivoted at 67 to one end of the link 68, the other end of which is pivoted at 69 to one gear carriage and the other arm being connected by a link 70 to the rock arm 71 on the rock shaft 73. The rock shaft 73 is connected through any suitable mechanism to the drive shaft.

There is one lever 63, link 68, link 70, rock arm 71, for each gear carriage and the rock arms 71, which actuate adjacent gear carriages extend in opposite radial directions so that adjacent gear carriages are moved in opposite directions relatively to each other between the racks.

The links 68 are detachably connected to the levers 64 so that the gear carriages can be removed and replaced, these links being here shown as formed with partly open bearings 72, or bearings in the form of a hook for receiving the pivot pin 73 on the lever 64. The links 68 are similarly detachably connected to the heads 53 in order to permit the arbors to be reversed end for end with the link 58 attached to the heads 54. When removing and replacing the gear carriages the upper rack carriage 42 is preferably lifted to carry the upper rack teeth out of mesh with the gears. This lifting of the rack carriage 42 may be effected by any suitable means as a block and tackle or by a lifting screw.

In operation, the gears are lapped on their upper and lower sides simultaneously and rolled about their axes by the lengthwise reciprocations of the rack carriages 42, 43, and by the crosswise reciprocations of the gear carriages, and owing to such relative movements and to the fact that the gears are engaged with racks on diametrically opposite sides thereof, the lapping operations are rapid and accurate.

What I claim is:

1. In a gear lapping machine, the combination of a pair of opposing racks, a support for rollably mounting the unlapped gear between the racks whereby the gear meshes with both racks and means for effecting relative movement of the racks and gear support in a direction lengthwise of the racks, substantially as and for the purpose described.

2. In a gear lapping machine, the combination of a pair of opposing racks, a support for rollably mounting the unlapped gear between the racks, whereby the gears are in mesh with both racks, and means for effecting relative movement of the racks and gear support in a direction crosswise of the racks, substantially as and for the purpose specified.

3. In a gear lapping machine, the combination of a pair of opposing racks, and a support for rollably mounting the unlapped gear between the racks, whereby the gear is supported in mesh with both racks, the racks being mounted to move in a general direction lengthwise of the racks and at changing angles to the teeth of the racks and means for effecting such movement, substantially as and for the purpose set forth.

4. In a gear lapping machine, the combination of a pair of opposing racks, a support for rollably mounting the unlapped gear between the racks, whereby the gear is in mesh with both racks, the racks being mounted to move in arcs extending in a general direction lengthwise of the racks and means for moving the racks, substantially as and for the purpose described.

5. In a gear lapping machine, the combination of a rack movable in an arc extending in a general direction lengthwise of the rack, a support constructed to mount an unlapped gear and hold it in mesh with the rack, means for actuating the rack and guiding the same in its arc of movement, substantially as and for the purpose specified.

6. In a gear lapping machine, the combination of a rack movable in an arc extending in a general direction lengthwise of the rack, a support constructed to mount an unlapped gear and hold it in mesh with the rack, means for actuating the rack and guiding the same in its arc of movement, and means for moving the gear support in a direction crosswise of the rack, substantially as and for the purpose set forth.

7. In a gear lapping machine, the combination of a pair of opposing racks, a support for rollably mounting the unlapped gear between the racks and means for effecting relative movement of the racks, and the gear support in a direction crosswise of the racks, substantially as and for the purpose described.

8. In a gear lapping machine, the combination of a pair of opposing racks, a support for rollably mounting the unlapped gear between the racks, whereby the gear is in mesh with both racks, said racks being mounted to move in directions lengthwise of both racks, and means for actuating one of the racks, whereby the gear is rotated and the motion thereof transferred to the other rack, substantially as and for the purpose specified.

9. In a gear lapping machine, the combination of a pair of opposing racks, a support for rollably mounting the unlapped gear between the racks, whereby the gear is in mesh with both racks, said racks being mounted to move in directions lengthwise of both racks, means for actuating one of the racks, whereby the gear is rotated and the motion thereof transferred to the other rack, and means for moving the gear carriage transversely of the racks, substantially as and for the purpose set forth.

10. In a gear lapping machine, the combination of a pair of opposing racks, a support for rollably mounting the unlapped gear between the racks, whereby the gear is in mesh with both racks, said racks being mounted to move in arcs extending in a general direction lengthwise of the racks, and means for actuating one of the racks whereby the gear is rotated and the motion transferred to the other rack, substantially as and for the purpose described.

11. In a gear lapping machine, the combination of a pair of opposing racks, a support for rollably mounting the unlapped gear between the racks, whereby the gear is in mesh with both racks, said racks being mounted to move in arcs extending in a general direction lengthwise of the rack, means for actuating one of the racks whereby the gear is rotated and the motion transferred to the other rack, and means for moving the carriage transversely of the racks, substantially as and for the purpose specified.

12. In a gear lapping machine, the combination of opposing racks, a support for rollably mounting the unlapped gear between the racks whereby the gears are in mesh with both racks, and means for effecting relative movement of the racks and the gear support in a direction lengthwise and crosswise of the racks, substantially as and for the purpose set forth.

In testimony whereof, I have hereunto signed my name, at Syracuse, in the county of Onondaga, and State of New York, this 26th day of February, 1923.

GEORGE C. CARHART.